(12) United States Patent
Parce

(10) Patent No.: X6633
(45) Date of Patent: Jul. 20, 1831

(54) POTASH, MANUFACTURING & LEACHING ASHES

(76) Inventor: Ephraim Parce

Ephraim Paice
Letters Patent

The Schedule referred to in these Letters Patent and making
part of the same containing a description in the words of the said
Ephraim Paice himself of his improvement in the
method of preparing and leaching ashes and making potash
Patented to him on the 20th day of July 1831 which Let-
ters Patent being hereby cancelled on account of a defective
specification. To all to whom these presents shall come:
Be it known that I Ephraim Paice of the town of [illegible] in
the County of Chenango (family residing in the town of [illegible]-
[illegible] in the said County) and State of New York have invented
and discovered an improvement in preparing and leaching
ashes and making potashe and the following is a full and
exact description of the same to wit. The said improvement
consists of two parts — First, in the application of lime
and salt dissolved in water heated to a boiling heat to
crude ashes. Both these chemical agents have heretofore
been used in the manufacture of potash. but the inventor of
this improvement claims that the use of them at a boiling
heat is new and is a discovery by him. These agents may be
thus applied in different ways. First by laying alternate
layers of ashes and lime or otherwise mixing them, and pour-
ing upon them water at a boiling heat containing a quantity
of salt proportioned to the lime and ashes as hereinafter
mentioned Secondly, by mixing crude ashes and common
salt and pouring upon them boiling water containing a
quantity of lime proportioned to the salt and ashes as
hereinafter mentioned, Third by combining lime and salt
in the proportions hereinafter mentioned dissolving them in
water and pouring the mixture while at a boiling heat on
the crude ashes. Such a quantity of this mixture only
should should be used; as will merely saturate the ashes. This third mode is greatly to be prefered to any other. Common salt of fifty six pounds to the bushel and unslacked lime are the materials used- in the proportion of fifteen pounds of salt to one bushel of unslacked lime applied to twenty bushels of common house ashes- about eighty gallons of water will be sufficient to use with the above materials.

These exact proportions are not essential. but various experiments have proved them to be the best, to produce the desired effect. Second The ashes being thus prepared cold water is poured upon them. which mingling with the mixture above described (with which the ashes have been saturated) leaches them more effectually than has ever been done by any process heretofore known. and produces an article of a purity equal to any in the market.

- The following directions exhibit the manner of using the said improvement in the third mode above specified. The manner of using the said improvement in the first and second modes above specified is shown in the above definition of those modes respectively. Directions. calculated for twenty bushels of house ashes. Prepare the leaches with lime bottoms. in the usual manner. The lime not to exceed two inches in depth, put about eighty gallons of water in a kettle. add to the water fifteen pounds of common salt. raise the fire under the kettle and just before the water arrives at boiling heat add one bushel of unslacked stone lime. it will immediately boil. and in this state should be applied to the ashes in the following manner viz. Put a layer of ashes four inches deep in the leaches and scald it so as to be thoroughly wet with the boiling mixture above mentioned then add another layer and scald as before and continue to add ashes in this manner until you have have put four layers into the leaches, each layer to be scalded with the boiling mixture as before mentioned. If eighty gallons of the mixture should not be sufficient to wet or moisten all the ashes. increase the quantity of the mixture by adding more water in the Kettle. When field ashes are used. the salt in the mixture should be reduced one half and the lime increased one fourth. After preparing the four layers of ashes in the leaches as before mentioned turn on cold water until it stands two inches above the ashes and keep the ashes so covered with water until the strength has run off which will be in the course of eight or ten hours. Boil the liquor -- & -- melt it down in the usual manner Witnesses
Solomon Ensign Jr
Orion H. Smith Ephraim Pace

[illegible]